United States Patent
Hyers (10) Patent No.: US 9,624,958 B2
(45) Date of Patent: Apr. 18, 2017

(54) ADAPTOR FOR CONNECTING AN ELECTRONIC DEVICE HAVING A CAMERA TO AN OPTICAL DEVICE

(75) Inventor: Michelle Hyers, Hicksville, NY (US)

(73) Assignee: Carson Optical, Inc., Ronkonkoma, NY (US)

( * ) Notice: Subject to any disclaimer, the term of this patent is extended or adjusted under 35 U.S.C. 154(b) by 451 days.

(21) Appl. No.: 13/591,588

(22) Filed: Sep. 11, 2012

(65) Prior Publication Data

US 2014/0072362 A1     Mar. 13, 2014

(51) Int. Cl.
| | | |
|---|---|---|
| F16B 21/00 | (2006.01) | |
| F16B 21/06 | (2006.01) | |
| F16M 13/02 | (2006.01) | |
| G03B 17/48 | (2006.01) | |
| G03B 17/56 | (2006.01) | |

(52) U.S. Cl.
CPC ......... *F16B 21/065* (2013.01); *F16M 13/022* (2013.01); *G03B 17/48* (2013.01); *G03B 17/566* (2013.01); *Y10T 29/49876* (2015.01); *Y10T 29/49895* (2015.01); *Y10T 403/18* (2015.01)

(58) Field of Classification Search
CPC ..... F16B 21/065; G03B 17/566; G03B 17/48; F16M 13/022; Y10T 29/49895; Y10T 29/49876; Y10T 403/18
See application file for complete search history.

(56) References Cited

U.S. PATENT DOCUMENTS

| | | | | | |
|---|---|---|---|---|---|
| 2,765,718 | A | * | 10/1956 | Beecher | 396/432 |
| 2,933,992 | A | * | 4/1960 | Bushnell et al. | 396/432 |
| 3,292,490 | A | * | 12/1966 | Moore | 396/432 |
| 3,721,170 | A | * | 3/1973 | Johnson | 359/503 |
| 3,798,665 | A | * | 3/1974 | Eloranta et al. | 396/432 |
| 3,898,678 | A | * | 8/1975 | Walworth | 396/432 |
| 3,900,021 | A | * | 8/1975 | Makepeace et al. | 600/112 |
| 3,900,858 | A | * | 8/1975 | McCann et al. | 396/432 |
| 3,981,021 | A | * | 9/1976 | Beecher | 396/432 |
| 4,192,591 | A | * | 3/1980 | Yobaccio | 396/17 |
| 4,273,431 | A | * | 6/1981 | Farmer et al. | 396/17 |
| 4,297,017 | A | * | 10/1981 | Farmer | 396/166 |
| 5,315,344 | A | * | 5/1994 | Clark et al. | 396/249 |
| 6,147,797 | A | * | 11/2000 | Lee | 359/363 |
| 6,327,078 | B1 | * | 12/2001 | Lee | 359/363 |
| D502,201 | S | * | 2/2005 | Hines et al. | D16/208 |
| D502,481 | S | * | 3/2005 | Hines et al. | D16/208 |
| 7,715,702 | B2 | * | 5/2010 | Sakurai | G02B 7/14 359/503 |
| 8,253,787 | B2 | * | 8/2012 | Yamamoto | 348/79 |

(Continued)

*Primary Examiner* — Victor MacArthur
(74) *Attorney, Agent, or Firm* — Carmody Torrance Sandak & Hennessey LLP (57) ABSTRACT

This invention comprises an adaptor device for connecting an electronic device having a camera to a range of optical devices, including but not limited to binoculars, monoculars, riflescopes, spotting scopes, telescopes, and microscopes. This adaptor device has a plurality of protrusion that provide a self-centering and fitted connection between the electronic and optical device, so that the optical axes are aligned so that the user may take images or video on their electronic device through the optical device. The structure of the adaptor device allows the adaptor to fit a range of differently sized optical device, denoted by the diameter of the eyepiece end of the optical device.

8 Claims, 9 Drawing Sheets

(56) References Cited

U.S. PATENT DOCUMENTS

| | | | |
|---|---|---|---|
| 8,279,544 B1* | 10/2012 | O'Neill | G02B 7/14 |
| | | | 359/819 |
| 2008/0043322 A1* | 2/2008 | Sauter et al. | 359/363 |
| 2009/0093274 A1* | 4/2009 | Yamamoto | 455/566 |
| 2010/0239367 A1* | 9/2010 | Olivier | 403/409.1 |
| 2012/0065638 A1* | 3/2012 | Moore | 606/62 |
| 2012/0207538 A1* | 8/2012 | Rizk | 403/315 |

* cited by examiner

ADAPTOR FOR CONNECTING AN ELECTRONIC DEVICE HAVING A CAMERA TO AN OPTICAL DEVICE

FIELD OF THE INVENTION

There are many common optical devices, such as binoculars, monoculars, riflescopes, spotting scopes, telescopes, and microscopes, which do not have image recording capabilities, such as a built-in camera. These types of optical devices each have an eyepiece end, the end closest to the observer and a objective end, the end closest to the object being viewed. The external housing of the eyepiece lens end, also commonly referred to as an eyecup, has an approximately cylindrical shape mirroring the cylindrical shape and size of the eyepiece lens. Each type and size of optical device corresponds to a range of diameters of the external cylindrical housing for eyepiece lens end.

In order to having imaging recording capabilities with these optical devices, some versions of these optical devices have been made with integrated cameras or attachment means to a full sized DSLR camera but the result is always a bulky, heavy and expensive design.

Since many consumers now carry a portable electronic device, such as a phone or tablet with them that already has a camera, it would be convenient for this camera to be used in combination with these optical devices. However, it is not a simple and easy matter of aligning and connecting the two optical devices together, namely, the camera of the electronic device to the optical device. The reasons for these difficulties in design is that for proper imaging, the optical axis of each device must be lined up very closely, and the electronic device must be held snugly and securely in place, and while accounting for a wide range of sizes of the external cylindrical housing for the eyepiece end of the optical devices.

BACKGROUND OF THE INVENTION

There is prior art regarding the connection of cameras or electronic devices having a camera to an optical device, but none of these prior art adaptor devices utilize a simple, yet self-centering and fitted connection that is capable of fitting to a range of sizes and types of optical devices.

Many prior art examples are designed to support only a very specific optical device, corresponding to a single or prohibitively narrow band of diameters of the external housing of the eyepiece end. For example, one prior art example is the Meopta Meopix iScoping adaptor, which has a fixed-diameter plastic ring that is designed to connect to Meopta brand binoculars with the same sized eyecups, or otherwise only designed to work with a few brands of 42 mm binoculars. Furthermore, the fixed diameter, cylindrical plastic ring may not have a snug and fitted hold on optics with a smooth rubber, plain plastic or metal housing or housing that doesn't have a matching contour to the adaptor. The construction does not allow for the ability to conform and grip onto these types of housings. Therefore, the structure of such prior art is limiting not only to size but material and contour of the housing.

Other similarly limited approaches use threads on the adaptor to match up with threads on the optical device. This type of approach is also very specific since the threads on the adaptor limit its functioning with mating threads of a single diameter and thread pitch.

Another common approach is a clamping mechanism with one or more screw adjustment, like Orion SteadyPix Telescope Photo Adapter for iPhones or digiscoping adaptors such as the one from Barska for DSLR. This has the benefit of being capable of attaching to a wider range of diameters of external eyepiece housings, but is not geometrically self-centering, and as a result these types of clamping designs typical requires other adjustment knobs or controls to properly center and position the optical device related to the camera of the electronic device. This becomes a complicated procedure of adjustments for the users, and is very time consuming and frustrating for anyone using the device on multiple optical devices.

The prior art does not demonstrate an adaptor device between optical devices and electronic devices having a camera, which meets the requirements of being self-centering so as to align the optical axes, fitted so as to provide a snug and conforming fit to a range of materials and shapes of a cylindrical end of the optical device, and more universal so as to fit a range of diameters of a cylindrical end of the optical device. Furthermore, the prior art can not meet these requirements, especially without the need for adjustments by the user, such as tightening down a clamp or centering the axes manually.

OBJECTS AND SUMMARY OF THE INVENTION

To overcome the perceived deficiencies in the prior art and to achieve the objects and advantages set forth above and below, the present invention is, generally speaking, directed to a novel and improved adaptor device, which can connect an optical device to an electronic device having a camera.

For example, it is objectives of the present invention to provide an improved adaptor device that adequately fits a range of optical devices, while still providing a secure and self-aligned connection to the electronic device having a camera. Said adaptor device is easier to use and generally more universal than prior art constructions.

Another objective of the present invention to utilize a self-centering and fitted connection that is capable of fitting to a range of sizes and types of optical devices, without requiring a very specific mating portion on the optical device, such as threads or connector.

Another objective of the present invention is to develop a adaptor device which does not require user adjustments to properly center or align the optical device. Furthermore, it would not require the user to adjust any knob or clamp so that the optical device is held tight by the adaptor device.

Further objectives and advantages of this invention will become more apparent from a consideration of the drawings and ensuing description.

In a preferred embodiment, an adaptor device for coupling an electronic device comprising a camera with an optical axis, to an optical device having a first optical axis and at least one cylindrical end, wherein the adaptor device comprises: a main body coupleable to the electronic device and alignable with the optical axis of the camera of the electronic device, and having a bottom surface that includes at least one opening, a plurality of protrusions connected to the top surface of the main body and positioned around a common center, wherein each protrusion consists of at least one of a first member and a first member having a frictional segment, and wherein the plurality of protrusions form a self-centering and fitted connection when placed on the cylindrical end of the optical device, wherein the device is alignable with the first optical axis of a plurality of optical devices, corresponding to the range of external diameters of the cylindrical end of the optical device.

In a preferred method for connecting an electronic device having a camera with an optical axis, to an optical device having a first optical axis and at least one cylindrical end, with an adaptor device comprises: a main body coupleable to the electronic device and alignable with the optical axis of the camera of the electronic device, and having a bottom surface that includes at least one opening, a plurality of protrusions connected to the top surface of the main body and positioned around a common center, wherein each protrusion consists of at least one of a first member and a first member having a frictional segment, and wherein the plurality of protrusions form a self-centering and fitted connection when placed on the cylindrical end of the optical device, wherein the device is alignable with the first optical axis of a plurality of optical devices, corresponding to the range of external diameters of the cylindrical end of the optical device.

The invention accordingly comprises the features of construction, combination of elements and arrangement of parts which will be exemplified in the construction, illustration and description hereinafter set forth, and the scope of the invention will be indicated in the claims.

BRIEF DESCRIPTION OF THE DRAWINGS

The above set forth and other features of the invention are made more apparent in the ensuing Description of the Preferred Embodiment when read in conjunction with the attached drawings, wherein.

Identical reference numerals in the figures are intended to indicate like parts, although not every feature in every figure may be called out with a reference numeral.

DETAILED DESCRIPTION OF THE PREFERRED EMBODIMENT

Figure 1:
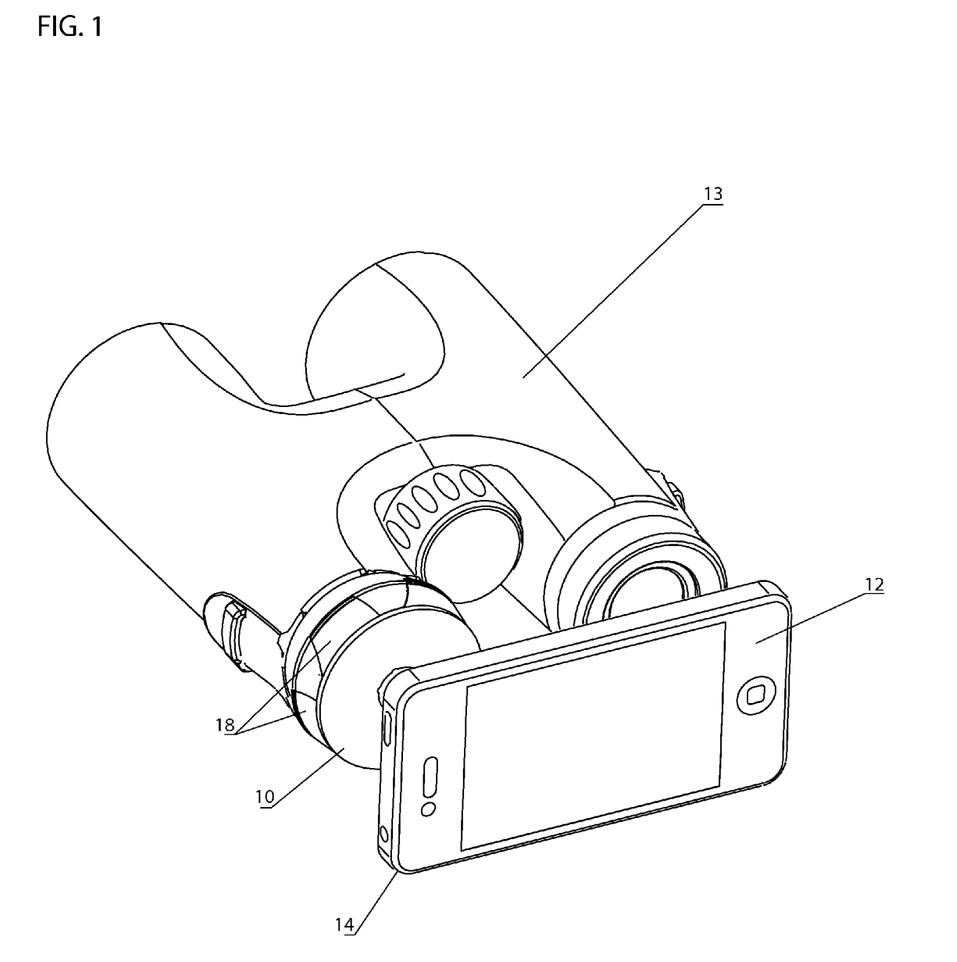
FIG. 1 is a perspective view of the preferred embodiment of the adaptor device, wherein the adaptor device is shown connecting to a binocular as the illustrated optical device. In this embodiment, the adaptor device is directly connected by physical, mechanical, magnetic or a combination thereof, means to the illustrated electronic device.
Figure 2:
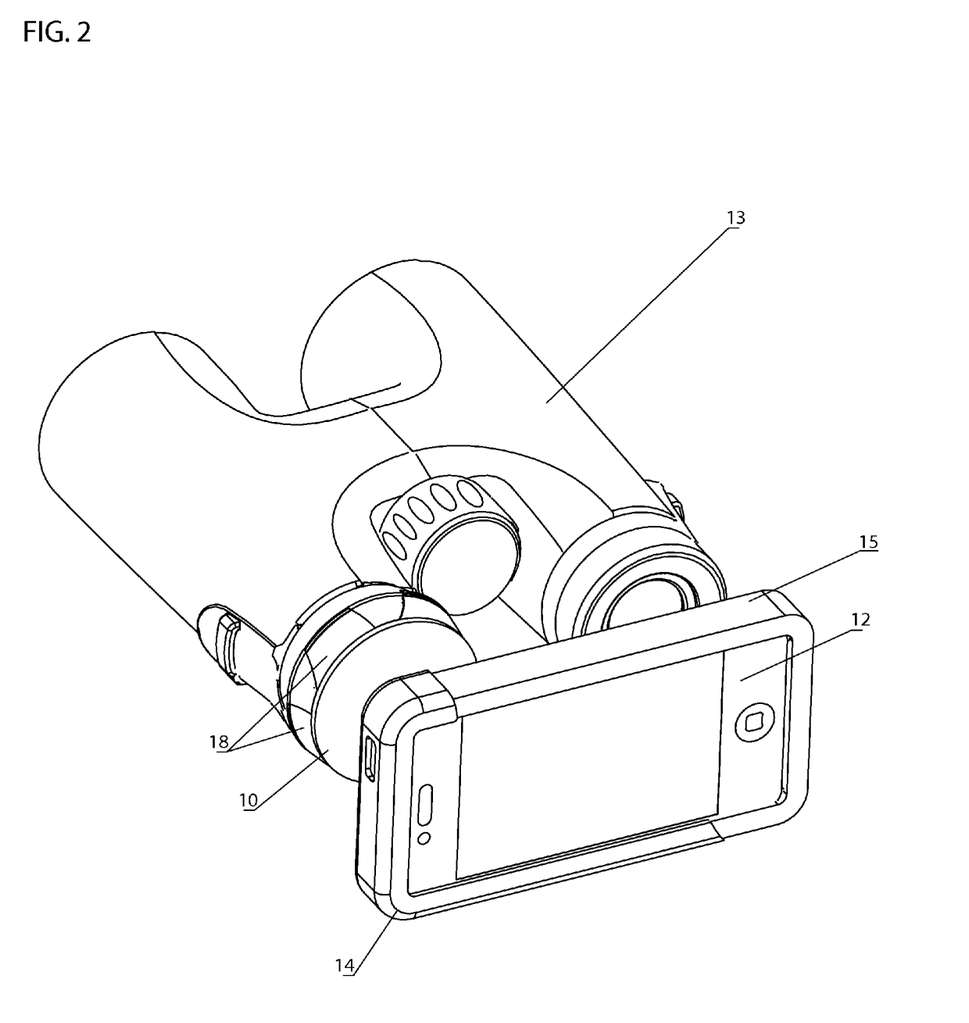
FIG. 2 is another preferred embodiment of FIG. 1, wherein this embodiment has the adaptor device indirectly connected by the use of two additional components to the electronic device, namely a holder and a case.

The preferred embodiment of the adaptor device in FIG. 1 having a main body 10, and a plurality of protrusions 18. The optical device 13 shown is binoculars, wherein the adaptor device is aligned with the binoculars' first optical axis, or if in the case of a monocular, the sole optical axis. The device is depicted in a coupled state to an electronic device comprising a camera 12. In this example shown, the electronic device having a camera 12 is a smartphone attached via physical, mechanical, magnetic, or a combination thereof means to the adaptor device. For example, the main body could include an array of magnets that mates with a matching set of magnets that are part of the electronic device. However, the adaptor device may also be coupleable to the electronic device indirectly by utilizing additional components, such as a holder, such as a case, for the electronic device. In the embodiment shown in FIG. 2, the holder is a plastic sleeve 14 maintaining a grip around a rubber case 15 that encases the electronic device.

Figure 3:
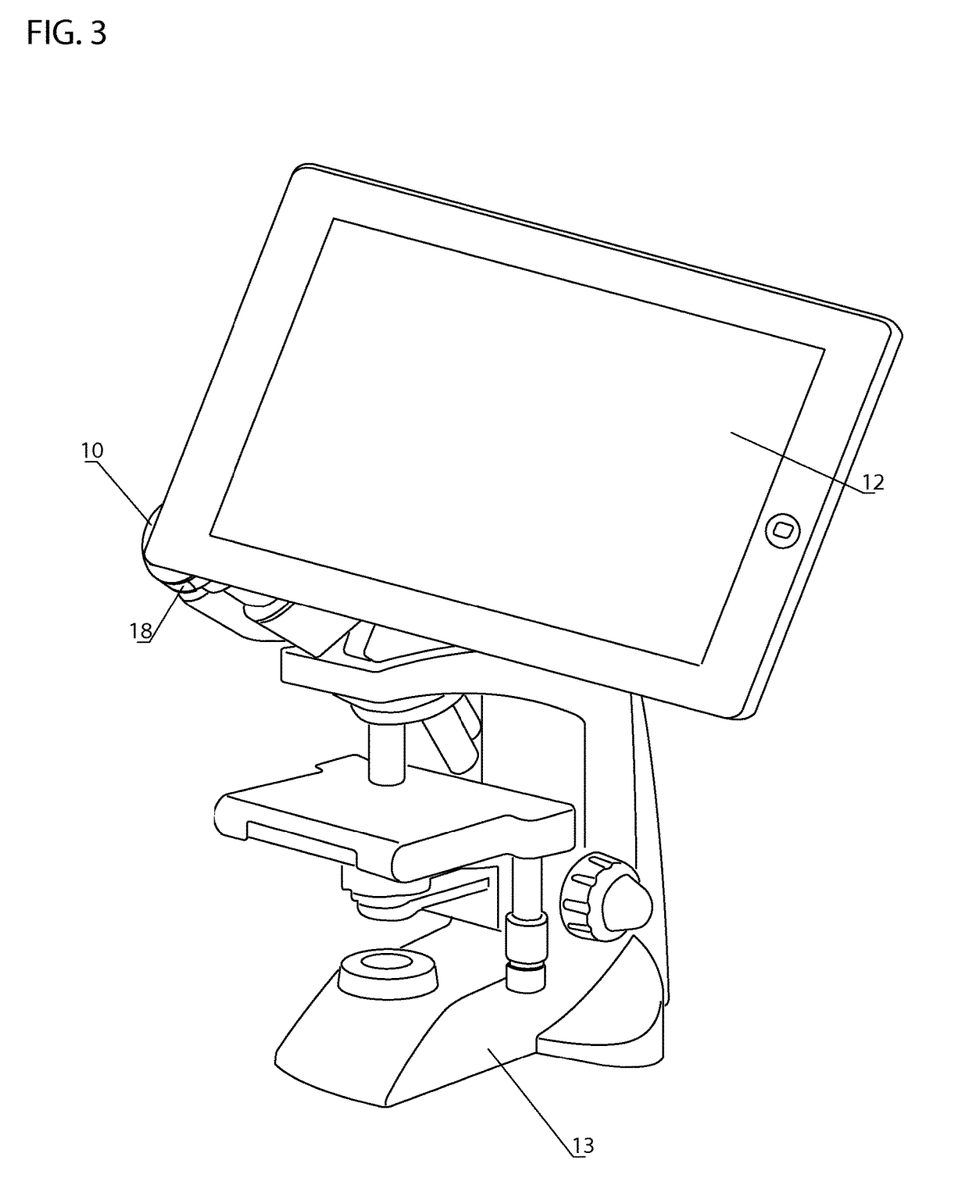
FIG. 3 is a perspective view of the preferred embodiment of the adaptor device, wherein the adaptor device is shown connecting to a microscope, as the illustrated optical device. In this embodiment, the adaptor device is directly connected by physical or magnetic means to the tablet computer, as the illustrated electronic device.
Figure 4:
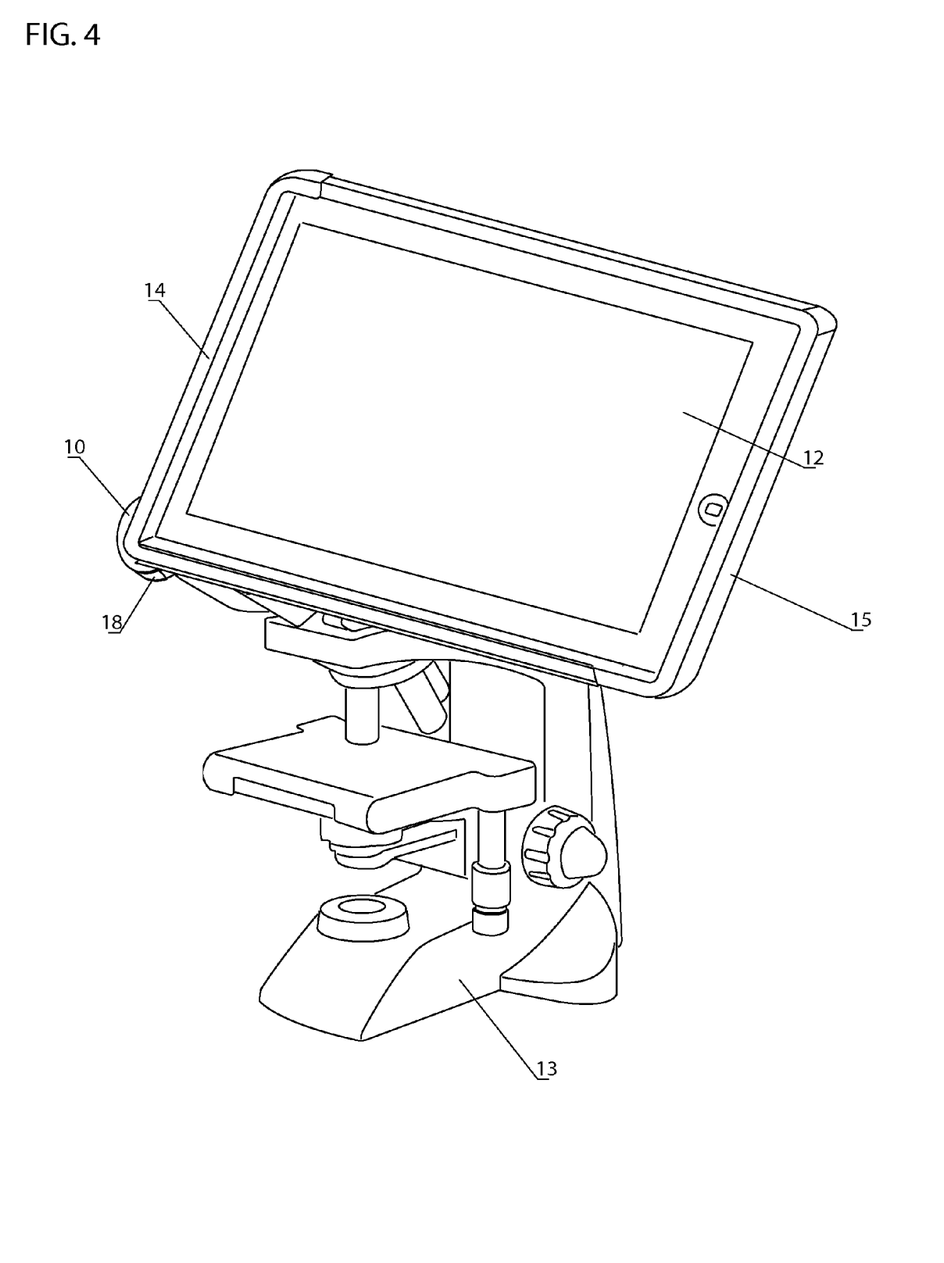
FIG. 4 is another preferred embodiment of FIG. 3, wherein this embodiment has the adaptor device indirectly connected by the use of two additional components to the electronic device, namely a holder and a case.

In another preferred embodiment of the adaptor device, the adaptor device also having a main body 10 and a plurality of protrusions 18 is shown with different instance of optical device 13 and electronic device comprising a camera 12 in FIG. 3. In this embodiment, the optical device is a microscope, specifically a biological microscope with a binocular eyepiece, wherein the adaptor is aligned with the first optical axis. This example can also apply to a monocular eyepiece microscope, where the first optical axis would be the sole optical axis. In this case, the electronic device comprising a camera 12 is a tablet. For this specific application, the diameter of the adaptor device can be adjusted for the smaller eyepieces typical of microscopes. Also, for heavier electronic devices such as a large tablet, reinforcing members or additional supports can be added to balance the weight of device while keeping the electronic device stable and secured. Once again, the electronic device can be coupleable directly as in FIG. 3 or indirectly as in FIG. 4 by use of additional components, such as a holder plastic sleeve 14 and a case 15.

Figure 5:
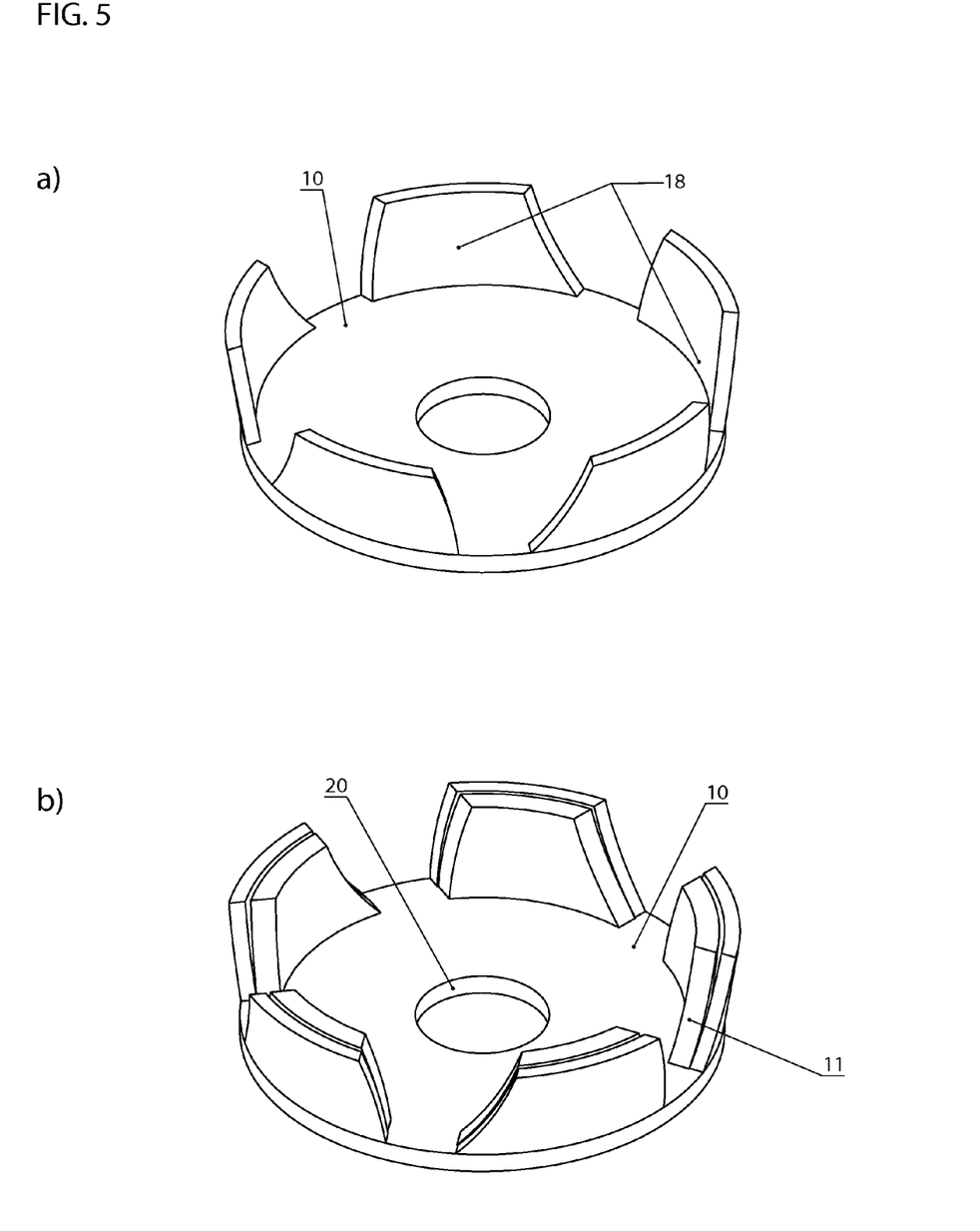
FIG. 5 is a perspective view of the adaptor device, without the optical or electronic device. The first inset is the perspective view of the preferred embodiment, indicating the main body with a plurality of protrusions having a first member. The second inset depicts the main body with a plurality of protrusions having a first member with frictional segment.

The adaptor device is shown without an optical or electronic device in FIG. 5a, which depicts the preferred embodiment with a main body 10 with an opening 20 in the bottom surface and a plurality of protrusions. In FIG. 5a, each protrusion 18 has only a first member, such as a solid resilient plastic, which is ideally a thin walled structure so that the protrusions may act as a flexure to conform to a range of diameters. The protrusions must be placed around a common center to ensure the device is self-centering with a range of diameters of optical devices. Also, the thickness and stiffness of the material must be balanced so as to provide a secure hold on the optical device yet able to bend to accommodate a range of diameters. Ideal thicknesses range from 0.75 mm to 1.75 mm for a typical ABS plastic material, depending on requirement for the range of diameters.

Another preferred embodiment shown in FIG. 5b depicts the protrusions can also include a frictional segment 11, which can serve several purposes. First, the frictional segments can provide additional hold with the housing of the optical device, especially when the optical housing is made of a smooth material, such as metal or plastic. Second, the frictional segments can also be of a flexible material that provides an additional conforming effect around different contours of the optical housing. Third, it can help extend the range of diameters the device is capable of coupling with, as these frictional segments if made from a flexible material, could compress radially to accept larger diameter optical devices, while still maintaining enough hold to grip onto smaller diameter optical devices. The frictional segments may be a portion of rubber paint, a rough foam, rough fabric or rubber portions, which may be permanently affixed or removeably connected to the first member. One benefit of having removable frictional segments is that it may be advantageous for the user to use both the first member independently and with the frictional segments, to even more substantially extend the range of diameters of the optical device that are coupleable to the adaptor.

Figure 6:
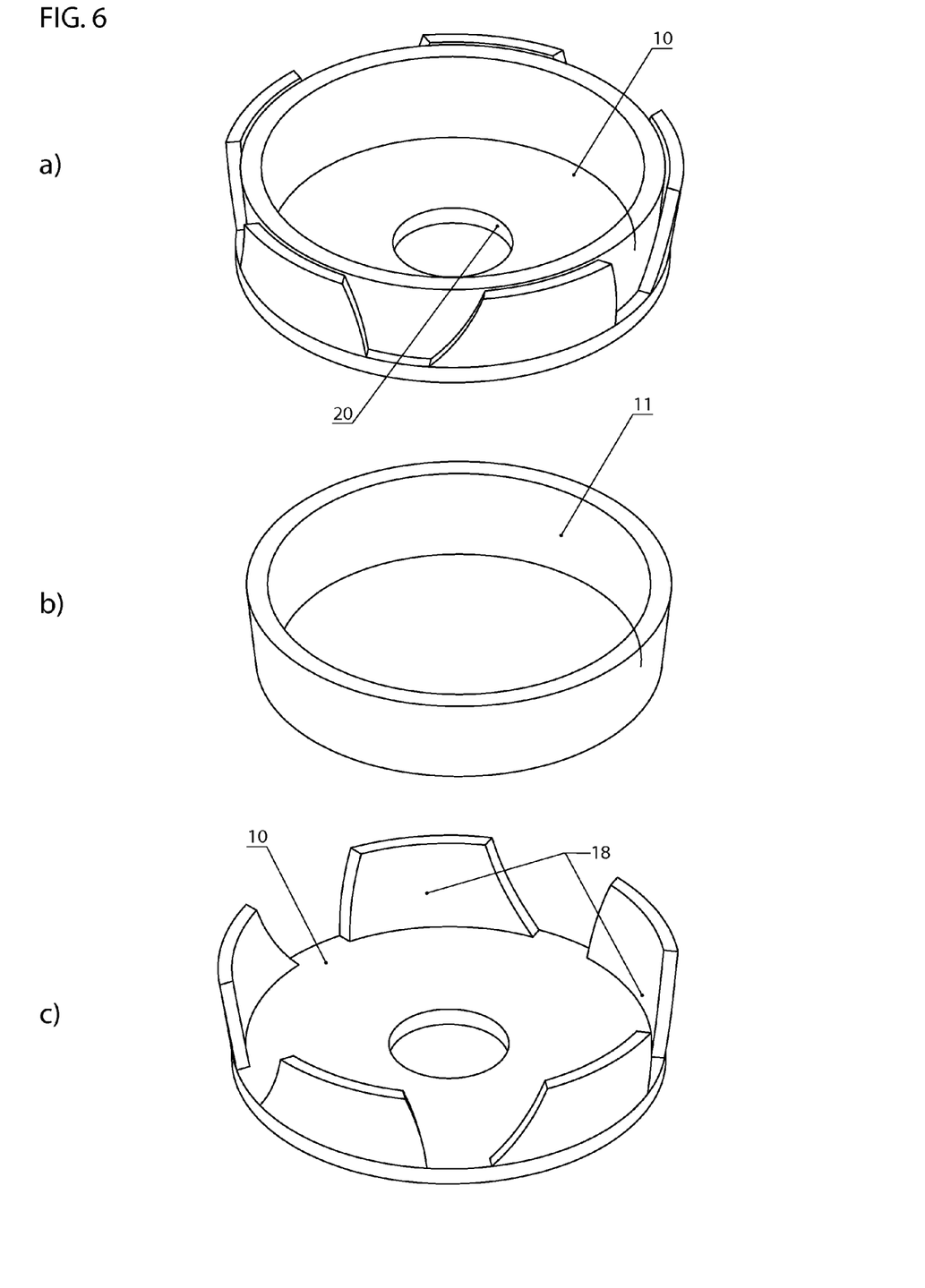
FIG. 6 is a perspective view of the adaptor device, without the optical or electronic device. The first inset is the perspective view of the preferred embodiment, indicating the main body with a plurality of protrusions, wherein the frictional segments make up a single flexible ring, shown in an assembled state. While second and third inset separately depicts the flexible ring and the main body with a plurality of protrusions, respectively.
Figure 8:
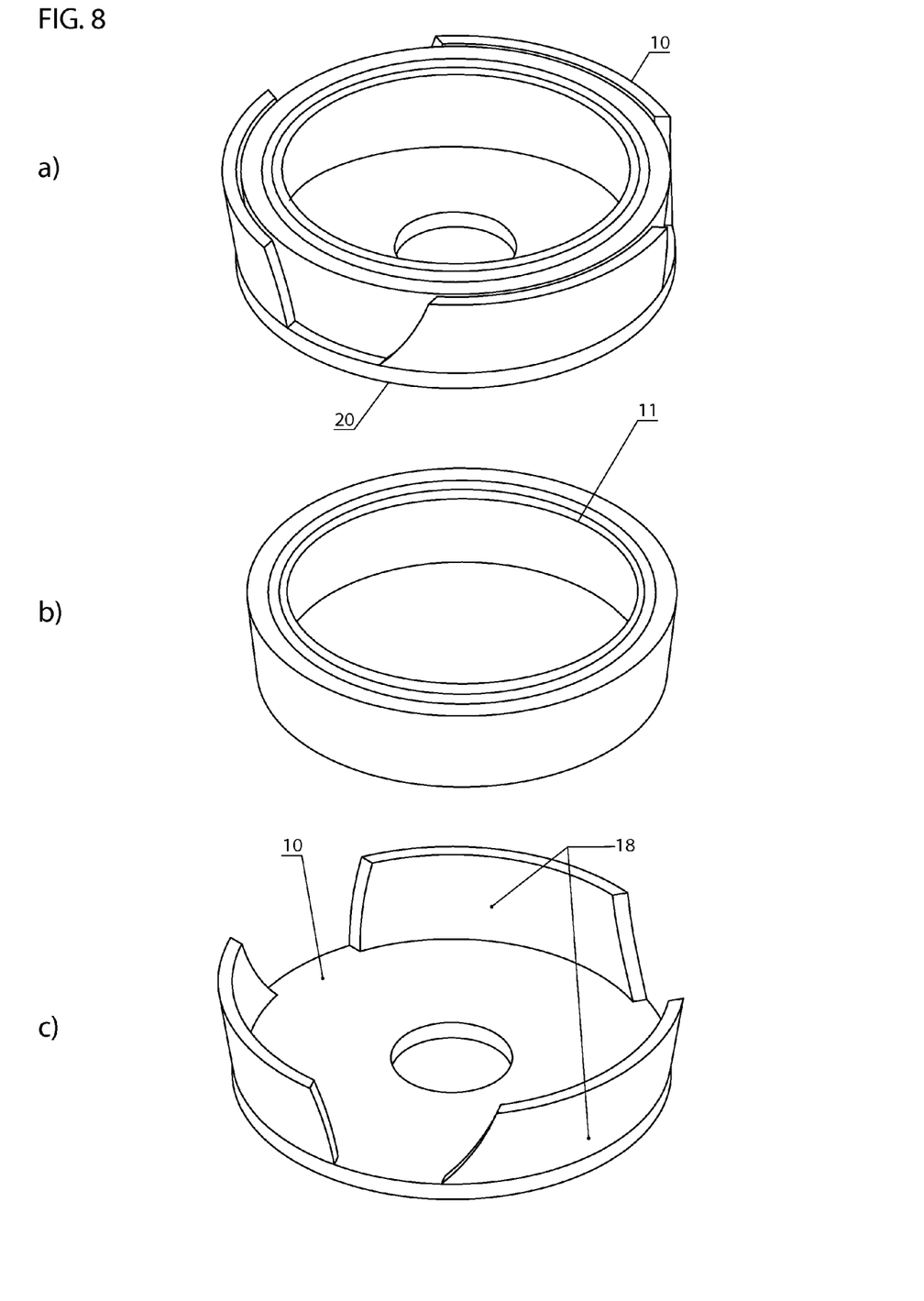
FIG. 8 is a perspective view of the adaptor device, without the optical or electronic device. The first inset is the perspective view of the preferred embodiment, indicating the main body with a plurality of protrusions, wherein the frictional segments make up a nested set of flexible rings, shown in an assembled state. While second and third inset separately depicts the nested flexible rings and the main body with a plurality of protrusions, respectively.

In another preferred embodiment in FIG. 6, the frictional segments 11 of the plurality of protrusions can form a single ring of frictional segments. Furthermore, this single ring is flexible so as to not constrict the radial conforming of the adaptor device to fit around multiple diameters of optical devices. The flexible ring is ideally made from an elastomeric material, such as silicone rubber, that can conform and stretch to meet a range of sizes and shapes. This ring is also a more convenient form of the frictional segments as the user can removeably connect a single frictional element to the adaptor device, so that for a very large range of diameters of optical devices, the user may utilize a few differently sized rings and switch out the ring for the specific device. In this case, only approximately three to five rings would be necessary to account for all existing optical products. The frictional segments can also be combined into a series of nested rings as shown in FIG. 8, for storage of the various sized rings, or for direct use. For example, with three nested rings, with use on a small diameter, all three rings can be left in place and used to connect to the optical device, while on a larger diameter, one or more rings can be removed and then the remaining rings in combination with the adaptor device can be used to connect to the optical device.

Figure 7:
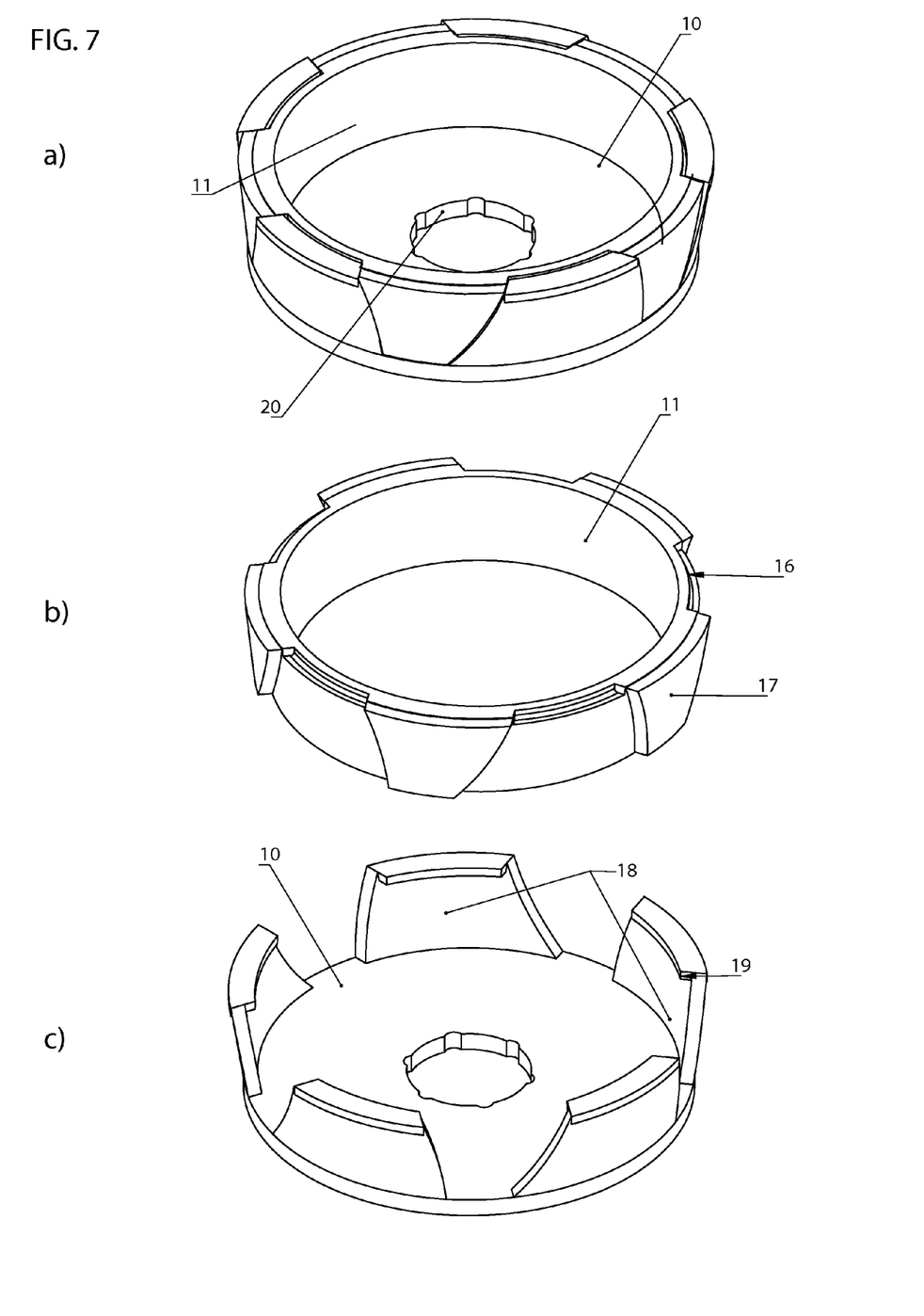
FIG. 7 is a perspective view of the adaptor device, without the optical or electronic device. The first inset is the perspective view of the preferred embodiment, indicating the main body with a plurality of protrusions and a flexible ring externally conforming to the plurality of protrusions, in an assembled state. While second and third inset separately depicts the flexible ring and the main body with a plurality of protrusions, respectively.

The flexible ring can also be externally shaped to conform to the protrusions as shown in FIG. 7, where for example there are additional ridges 17 extending outward in a radial direction. The benefit of these additional ridges is that when twisting the adaptor device around the optical device during the coupling, de-coupling or adjustment of orientation steps, the frictional segments 11 will stay in place relative to the main body 10. This is helpful if the user wishes to place their electronic device at a certain angle relative to the optical device, such as a horizontal or vertical orientation. Another additional feature shown in FIG. 7 is a flange 19 on the plurality of protrusions with a mating cutout 16 on the flexible ring. The benefit of these additional features is that during removal of the adaptor device from the optical device, the frictional segment may stay gripped onto the optical device, such that only part of the device is removed, thereby requiring two removal steps. These mating portions eliminate any possibility of having two removal steps, since these features retain the flexible ring within the flanges, so that the two components will always be removed together as a single unit. The flange 19 may also be use independently in the embodiment with only the first member, as it could help to snap onto a rim of an eyepiece. Additionally, all of the aforementioned features, namely the additional ridges 17 and the flange 19 with mating cutouts 16, can also eliminate the need for adhesive or other fasteners to join the frictional segments 11 to the other parts of the adaptor device. As a result, this also allows the user to easily switch out differently sized rings, in thickness and diameter, for their specific range of optical devices.

Figure 9:
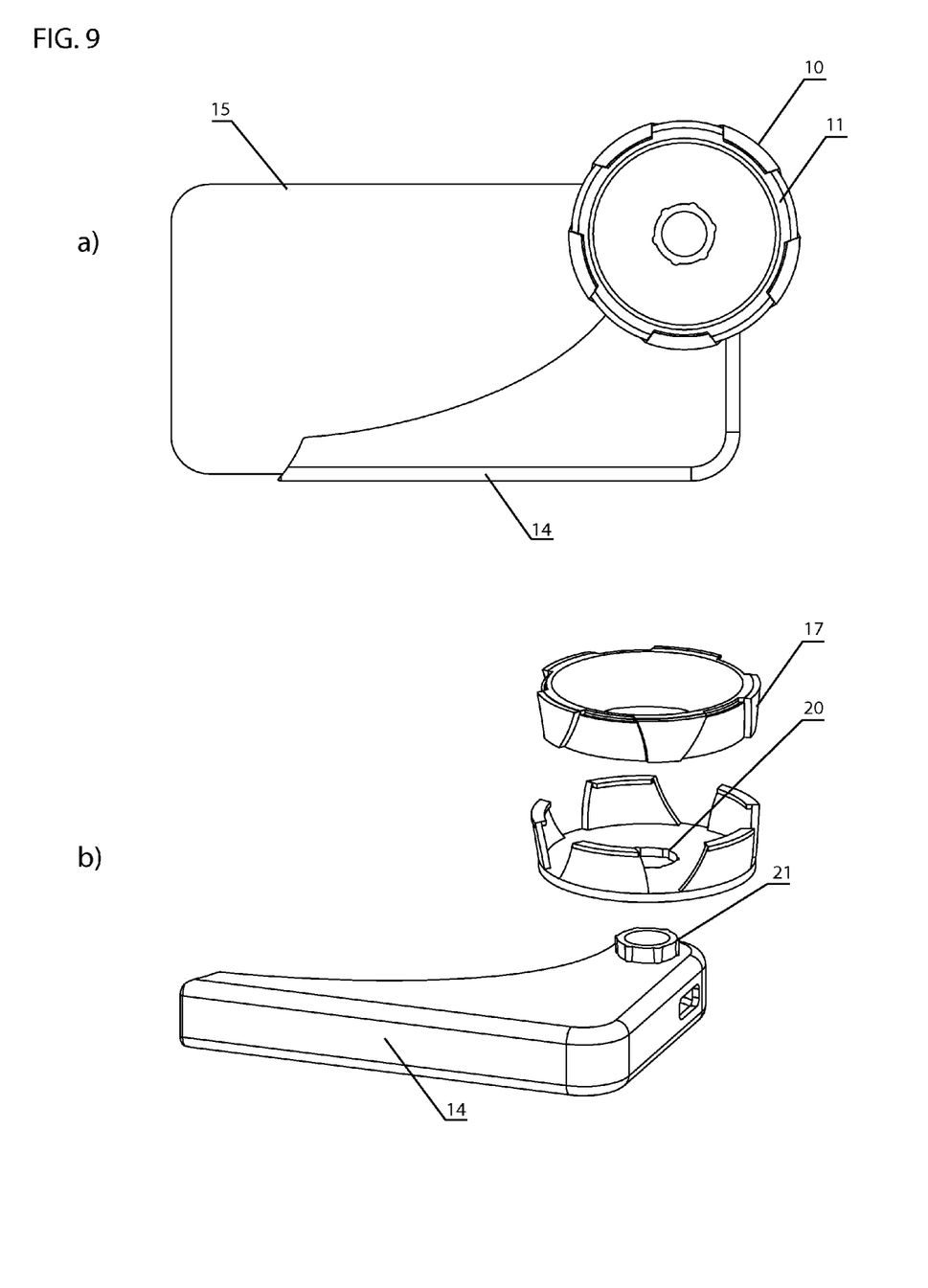
FIG. 9 is a perspective view of the adaptor device which includes a holder for the electronic device. The first inset is the perspective view of the preferred embodiment, indicating the main body with a plurality of protrusions and a flexible ring in an assembled state with the holder for the electronic device. While second inset depicts a preferred embodiment where the holder can removeably detached, for example by a snap-fit means, to the holder.

Also, the bottom surface of the main body 10 is ideally shaped to connect the adaptor device to the electronic device, such as in the case of a snap-fit connection between the adaptor device and a holder for the electronic device. For example, an cylindrical protrusion can be designed to snap-fit into a cylindrical cutout in the bottom surface of the main body. In one preferred embodiment as shown in FIG. 9, the cutout in the bottom surface of the main body is a cylindrical cutout 20 that mates to a cylindrical protrusion 21 in a case or holder for the electronic device. The use of a snap-fit connection could be advantageous to the user with multiple devices, who has a holder for each type of device with the same cylindrical protrusions. Then the user can mix and match the electronic devices with the optical devices with use of this adaptor device.

It can thus be seen that the present invention is advantageous and overcomes the perceived deficiencies in the prior art.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall there between.

The invention claimed is:

1. An adaptor device for coupling an electronic device comprising a camera with an optical axis, to any one of a plurality of optical devices having at least a first optical axis and at least one cylindrical end, wherein the adaptor device comprises:

a main body that is approximately planar, and alignable with the optical axis of the camera of the electronic device, and having a top surface that includes at least one opening having a center,
a holder for coupling and aligning the electronic device to the adaptor device, wherein the holder is alignable and coupleable to the main body,
a plurality of flexible protrusions including at least a first and a second flexible protrusion, wherein the protrusions are non-contiguous and positioned about the center of the main body, such that each of the protrusions is independently connected to the top surface of the main body,
wherein the plurality of flexible protrusions form a self-centering and fitted connection when placed on the cylindrical end of the optical device, wherein the fitted connection can be made directly via contact of the plurality of flexible protrusions with the cylindrical end of the optical device or indirectly via at least a first frictional segment between the plurality of flexible protrusions and the cylindrical end of the optical device, wherein the adaptor device is alignable with the first optical axis of at least the first one of a plurality of optical devices, having different external diameters.

2. The adaptor device as claimed in claim 1, wherein the holder consists of two parts: a plastic sleeve portion and a rubber case portion.

3. The adaptor device as claimed in claim 1, wherein the protrusions are angled relative to the top surface of the main body, in a direction away from their common center.

4. The adaptor device as claimed in claim 1, wherein the bottom surface of the main body is removeably connected to the holder of the electronic device.

5. The adaptor device as claimed in claim 1, wherein at least the first flexible protrusion is made of a plastic material and wherein the fitted connection is made indirectly via at least a first frictional elastomeric segment between the plurality of protrusions and the cylindrical end of the optical device.

6. The adaptor device as claimed in claim 1, wherein at least the first frictional segment is a flexible ring.

7. The adaptor device as claimed in claim 6, wherein each of the plurality of protrusions has a flange that mates with cutouts on the at least one flexible ring, so as to fixture the at least one flexible ring in position.

8. The adaptor device as claimed in claim 6, wherein the flexible ring is externally shaped to conform to at least the first flexible protrusion.

* * * * *